United States Patent
Dang et al.

(10) Patent No.: US 7,369,340 B1
(45) Date of Patent: May 6, 2008

(54) DISK DRIVE DETECTING DISK WARPING BY DETECTING NEGATIVE CORRELATION BETWEEN READ SIGNAL AMPLITUDES FROM TOP AND BOTTOM DISK SURFACES

(75) Inventors: Dean V. Dang, Amphur Prakret (TH); Philip Bernard Saram, Kuala Lampur (SG); Chakrit Choosang, Bangkae (TH); Jonas A. Goode, Lake Forest, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 315 days.

(21) Appl. No.: 11/314,483

(22) Filed: Dec. 21, 2005

(51) Int. Cl.
*G11B 27/36* (2006.01)
*G11B 5/09* (2006.01)

(52) U.S. Cl. .......................... 360/31; 360/46
(58) Field of Classification Search ............... None
See application file for complete search history.

(56) References Cited

U.S. PATENT DOCUMENTS

| 6,292,317 | B1 | 9/2001 | Alexander |
| 6,678,108 | B2 | 1/2004 | Smith et al. |

*Primary Examiner*—Fred F. Tzeng
*Assistant Examiner*—Dan I Davidson
(74) *Attorney, Agent, or Firm*—Howard H. Sheerin, Esq.

(57) ABSTRACT

A disk drive is disclosed comprising a disk having top and bottom surfaces, and top and bottom heads actuated over the top and bottom surfaces, respectively. Control circuitry detects a warping of the disk by writing a first test pattern to the top surface, reading the first test pattern to generate a first read signal, monitoring a first read signal value proportional to an amplitude of the first read signal, writing a second test pattern to the bottom surface, reading the second test pattern to generate a second read signal, monitoring a second read signal value proportional to an amplitude of the second read signal, and processing the first and second read signal values to detect a negative correlation between the amplitudes of the first and second read signals.

22 Claims, 7 Drawing Sheets

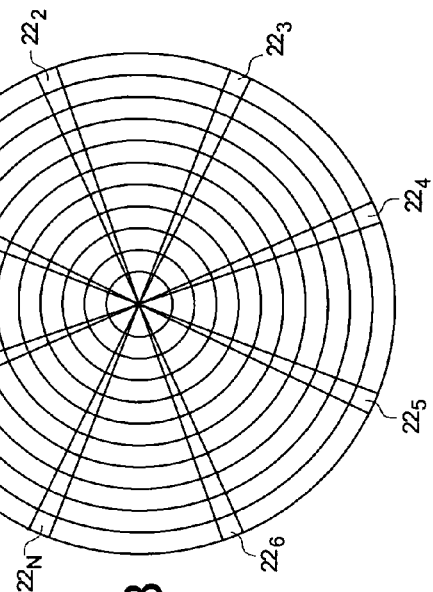
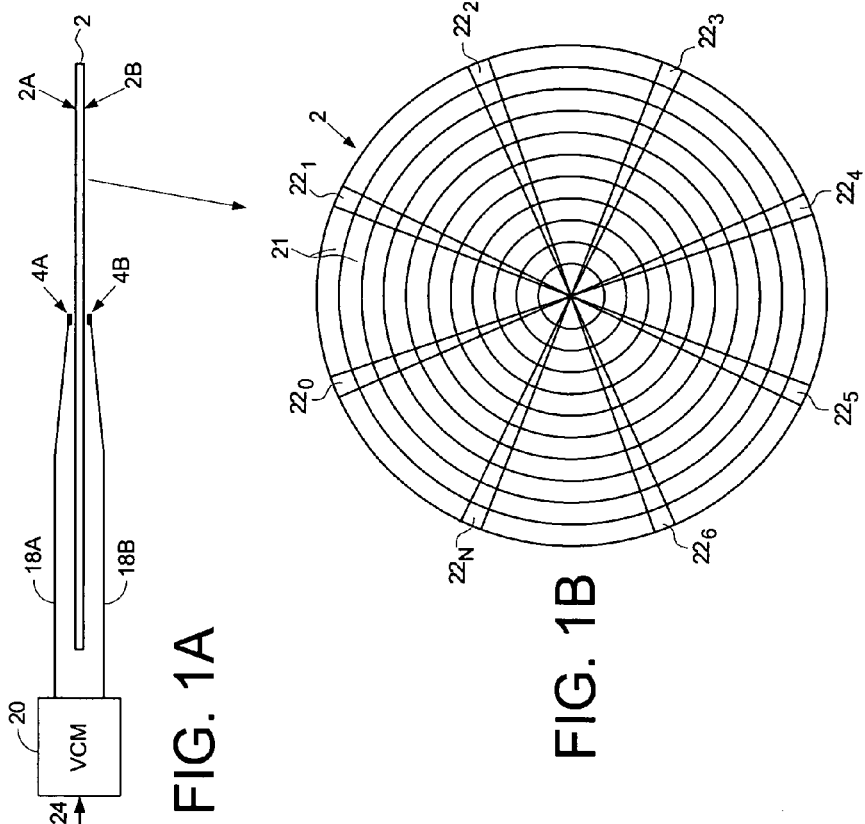
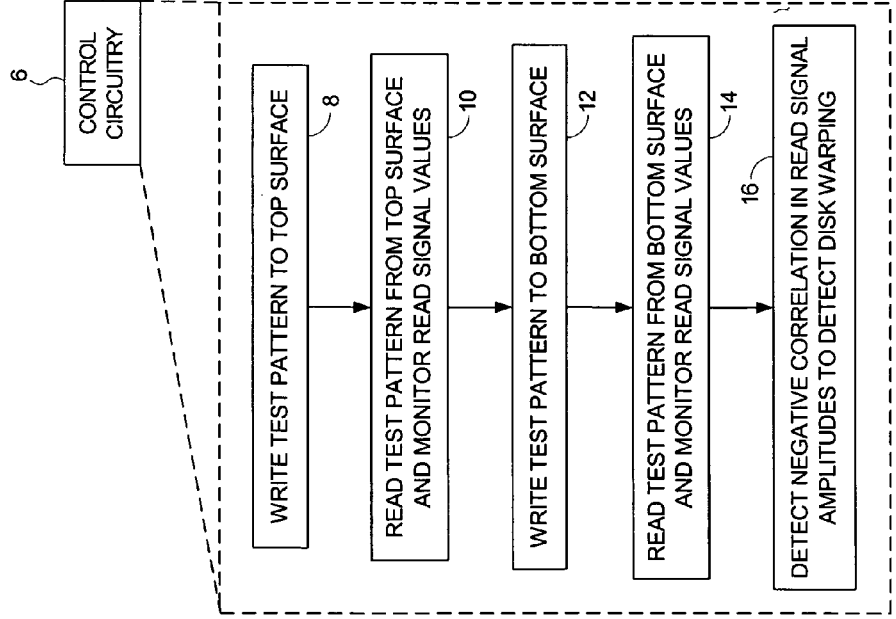

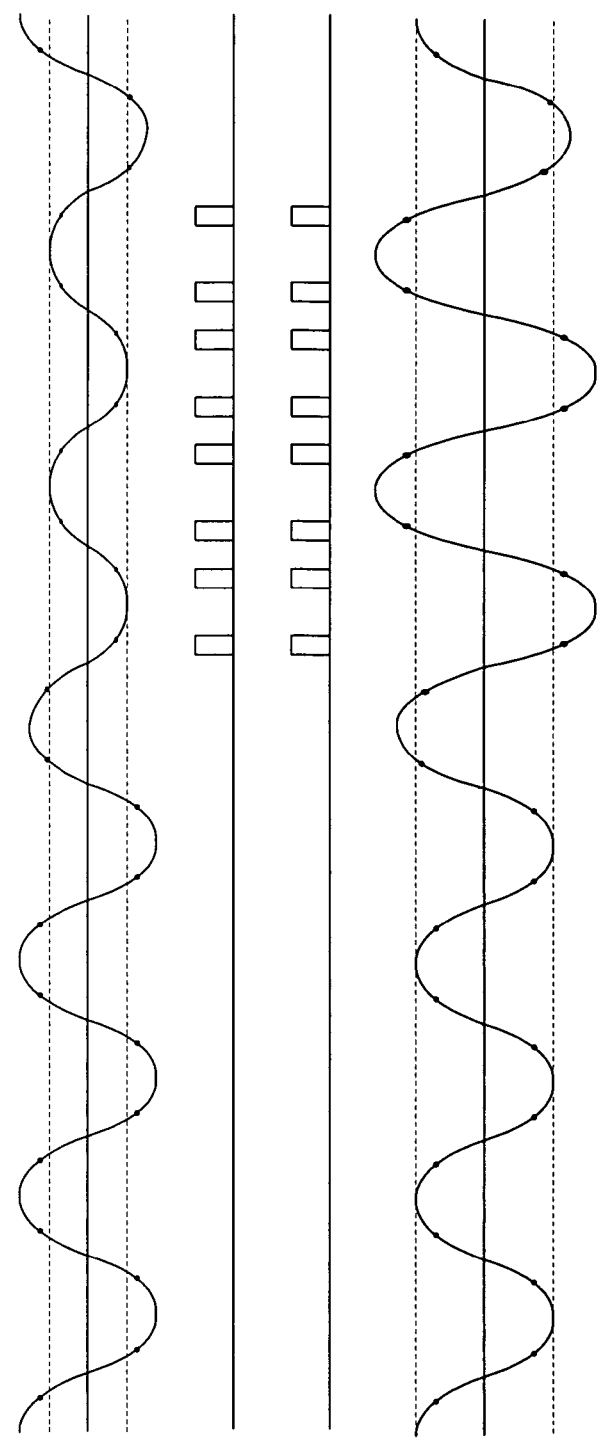

DISK DRIVE DETECTING DISK WARPING BY DETECTING NEGATIVE CORRELATION BETWEEN READ SIGNAL AMPLITUDES FROM TOP AND BOTTOM DISK SURFACES

BACKGROUND OF THE INVENTION

1. Field of the Invention

The present invention relates to disk drives for computer systems. More particularly, the present invention relates to a disk drive detecting disk warping by detecting a negative correlation between read signal amplitudes from top and bottom disk surfaces.

2. Description of the Prior Art

Disk drives typically include one or more disks that are clamped to a hub of a spindle motor. As the spindle motor rotates the disks, an air bearing forms between the disk surfaces and the heads so that the heads are said to "fly" just above the disk surface, wherein the read signal amplitude (and associated read signal quality) varies inversely with the fly-height of the head. Certain influences may cause a warping of the disk, for example, a particle contaminant may get caught between the clamp and the disk during the clamping process, or the disk itself may be warped due to a manufacturing defect. If the warping is significant, the resulting fluctuations in the read signal amplitude may render the disk drive inoperable.

There is, therefore, a need to repair or discard disk drives with a disk warping that exceeds a reliability threshold, for example, during manufacturing to prevent defective disk drives from entering the market.

SUMMARY OF THE INVENTION

An embodiment of the present invention comprises a disk drive including a disk having top and bottom surfaces, and top and bottom heads actuated over the top and bottom surfaces, respectively. Control circuitry detects a warping of the disk by writing a first test pattern to the top surface, reading the first test pattern to generate a first read signal, monitoring a first read signal value proportional to an amplitude of the first read signal, writing a second test pattern to the bottom surface, reading the second test pattern to generate a second read signal, monitoring a second read signal value proportional to an amplitude of the second read signal, and processing the first and second read signal values to detect a negative correlation between the amplitudes of the first and second read signals.

In one embodiment, the first test pattern is the same as the second test pattern, and in another embodiment, the first test pattern is different than the second test pattern.

In another embodiment, the control circuitry comprises a variable gain amplifier (VGA) for amplifying the first read signal and the second read signal, and the first and second read signal values are used to adjust a gain of the VGA. In one embodiment, the control circuitry further comprises a gain control operable to compute a gain error relative to a difference between a target read signal amplitude and a measured read signal amplitude, the gain controller is further operable to adjust the gain of the VGA in response to the gain error, and the first and second read signal values comprise the gain error.

In yet another embodiment, a first plurality of read signal values are used to adjust the gain of the VGA while reading the first test pattern, wherein a first average value is computed in response to the first plurality of read signal values, and a deviation is computed for each of the first plurality of read signal values from the first average value to generate a first plurality of deviation values. A second plurality of read signal values are used to adjust the gain of the VGA while reading the second test pattern, wherein a second average value is computed in response to the second plurality of read signal values, and a deviation is computed for each of the second plurality of read signal values from the second average value to generate a second plurality of deviation values.

In one embodiment, the control circuitry is further operable to compute a running average of the first and second plurality of deviation values. In another embodiment, the control circuitry is further operable to compare the first and second plurality of deviation values to a threshold, wherein the warping of the disk may be detected if n out of m deviation values exceed the threshold. In still another embodiment, a first peak in the first plurality of deviation values is computed, a second peak in the second plurality of deviation values is computed, and the first peak is compared to the second peak.

In another embodiment, the control circuitry is further operable to compare the negative correlation to a threshold.

In yet another embodiment, the control circuitry is further operable to detect a first bit sequence in response to the first read signal, and detect a second bit sequence in response to the second read signal. The first read signal value comprises at least one bit in the first bit sequence, and the second read signal value comprises at least one bit in the second bit sequence.

Another embodiment of the present invention comprises a method of detecting disk warping in a disk drive, the disk drive comprising a disk having a top surface and a bottom surface, a top head actuated over the top surface and a bottom head actuated over the bottom surface. The disk warping is detected by writing a first test pattern to the top surface, reading the first test pattern to generate a first read signal, monitoring a first read signal value proportional to an amplitude of the first read signal, writing a second test pattern to the bottom surface, reading the second test pattern to generate a second read signal, monitoring a second read signal value proportional to an amplitude of the second read signal, and processing the first and second read signal values to detect a negative correlation between the amplitudes of the first and second read signals.

BRIEF DESCRIPTION OF THE DRAWINGS

FIGS. 1A and 1B show a disk drive according to an embodiment of the present invention comprising a disk having top and bottom surfaces with respective top and bottom heads, and control circuitry for detecting a warping of the disk.

FIG. 1C is a flow diagram executed by the control circuitry according to an embodiment of the present invention wherein the disk warping is detected by detecting a negative correlation in the amplitudes of the top and bottom surface read signals.

FIGS. 7A-7D illustrate another embodiment of the present invention wherein a detected bit sequence represents the amplitude of the top and bottom read signals, wherein "drop-outs" detected on one disk surface and corresponding "drop-ins" on the other disk surface identify a negative correlation in the read signal amplitudes.

DESCRIPTION OF THE PREFERRED EMBODIMENTS

Figure 2A:
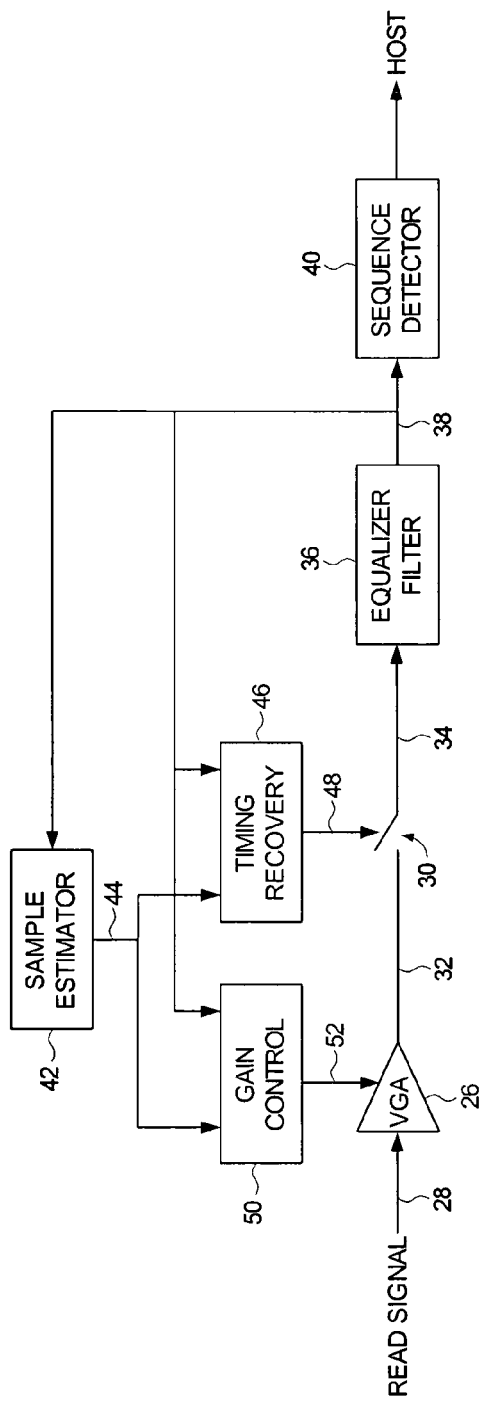
FIG. 2A shows components of a read channel according to an embodiment of the present invention, including gain control for generating a gain error used to adjust an amplitude of a variable gain amplifier (VGA).

FIGS. 1A and 1B show a disk drive according to an embodiment of the present invention comprising a disk 2 having a top surface 2A and bottom surface 2B with respective top head 4A and bottom head 4B. The disk drive further comprises control circuitry 6 operable to execute the flow diagram of FIG. 1C to detect a warping of the disk 2. At step 8 a first test pattern is written to the top surface 2A, and at step 10 the first test pattern is read from the top surface to generate a first read signal. A first read signal value proportional to an amplitude of the first read signal may be monitored. At step 12 a second test pattern is written to the bottom surface 2B, and at step 14 the second test pattern is read to generate a second read signal. A second read signal value proportional to an amplitude of the second read signal may also be monitored. At step 16 the first and second read signal values are processed to detect a negative correlation between the amplitudes of the first and second read signals. As would be well understood by those skilled in the art, the disk drive may comprise a plurality of disks, which may each be evaluated to detect possible warping.

Any suitable control circuitry 6 may be employed to implement the described embodiments of the present invention. In one embodiment, the control circuitry 6 comprises a microprocessor executing instructions, the instructions being operable to cause the microprocessor to perform the steps of FIG. 1C as well as other functions described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are stored on the disk 2 and read into a volatile semiconductor memory when the disk drive is powered on. In yet another embodiment, the control circuitry 6 comprises suitable logic circuitry, such as state machine circuitry.

In the embodiment of FIG. 1A, the top head 4A and bottom head 4B are mounted to the distal ends of actuator arms 18A and 18B, which are rotated about a pivot by a voice coil motor (VCM) 20. The disk 2, as shown in FIG. 1B, comprises a plurality of radially spaced, concentric data tracks 21 and a plurality of embedded servo sectors $22_0$-$22_N$ that form a plurality of servo wedges. Each servo sector $22_i$ comprises coarse head position information (e.g., track address) and fine head position information (e.g., servo bursts) processed by the control circuitry 6 to generate a control signal 24 applied to the VCM 20 in order to seek a selected head to a target data track and maintain the head over the target data track during read/write operations.

In one embodiment when executing the flow chart of FIG. 1C, the control circuitry 6 positions the top head 4A over a target data track on the top surface 2A and writes the first test pattern to the data track during a first revolution of the disk 2. During a second revolution of the disk 2, the control circuitry 6 reads the first test pattern from the top surface 2A and monitors a first read signal value proportional to the amplitude of the first read signal. The control circuitry 6 then positions the bottom head 4B over a target data track on the bottom surface 2B and writes the second test pattern to the data track during a third revolution of the disk 2. During a fourth revolution of the disk 2, the control circuitry 6 reads the second test pattern from the bottom surface 2B and monitors a second read signal value proportional to the amplitude of the second read signal.

Any suitable test pattern may be written to the top and bottom surfaces 2A and 2B. In one embodiment, the same test pattern is written to both the top and bottom surfaces 2A and 2B, and in an alternative embodiment, different test patterns are written to the top and bottom surfaces 2A and 2B. An example test pattern used in some embodiments of the present invention is the well known 2T pattern (where "T" refers to the read channel clock period) which results in substantially sinusoidal read signals. In another embodiment, a 3T or 4T pattern may also be used, as would be well known to those skilled in the art.

Any suitable read signal value that is proportional to the read signal amplitude may be monitored in embodiments of the present invention. The amplitude of the read signal may be measured directly by evaluating the read signal in the analog or discrete-time domain before the read signal has been amplified to match a target amplified read signal amplitude, or the amplitude may be measured indirectly by monitoring a read signal value that is indicative of the read signal amplitude. For example, in one embodiment the disk drive comprises a variable gain amplifier (VGA) for amplifying the read signal, and the read signal values comprise a VGA value, such as the VGA gain setting or the gain error used to generate the VGA gain setting.

This embodiment is illustrated in FIG. 2A, which shows read channel components according to an embodiment of the present invention, including a VGA 26 for amplifying a read signal 28 emanating from a head. The read channel further comprises a sampling device 30 for sampling the amplified read signal 32 to generate a sequence of read signal sample values 34. An equalizing filter 36 shapes the read signal sample values 34 according to a desired response (e.g., a partial response or PR) to generate equalized sample values 38. The equalized sample values 38 are processed by a sequence detector 40 (e.g., a Viterbi detector) to detect an estimated bit sequence representing the data recorded on the disk 2. The read channel further comprises a sample estimator 42 (e.g., a slicer) for estimating a target sample value 44 from an equalized sample value 38. The target sample value 44 and equalized sample value 38 are processed by timing recovery 46 to synchronize a sampling clock 48 to the baud rate of the data, and processed by gain control 50 to generate a VGA gain setting 52 for adjusting the gain of the VGA 26.

Figure 2B:
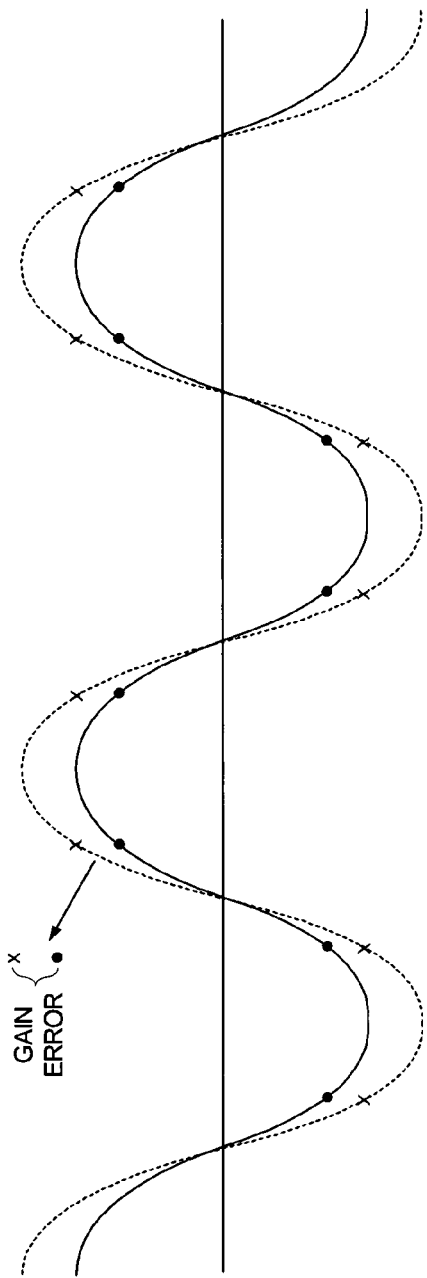
FIG. 2B illustrates the gain error computed as a difference between a target read signal amplitude and a measured read signal amplitude.

Operation of the gain control 50 is understood with reference to FIG. 2B which shows the substantially sinusoidal read signal generated by reading a 2T pattern. The solid circles represent the measured amplified read signal samples, and the "x"s represent target sample values corresponding to a target amplitude of the amplified read signal. The resulting gain error is used to adjust the gain setting 52 and therefore the gain of the VGA 26. In the example of FIG. 2B, the gain error will increase the gain setting 52 so as to increase the amplitude of the amplified read signal 32 toward the target amplitude. As described in greater detail below with reference to FIG. 3, a warping of the disk will cause the amplitude of the read signal to increase on one side of the disk 2 and to decrease on the opposite side of the disk 2. In one embodiment, the fluctuation in the amplitude of the read signals due to the disk warping is detected by monitoring the VGA gain error or the VGA gain setting 52.

Any suitable circuitry may be employed to implement the components of the read channel shown in FIG. 2A. In one embodiment, the components are implemented using discrete-time circuitry, and in an alternative embodiment, the components are implemented in firmware executed by a microprocessor. As described herein, this read channel circuitry is lumped together with the other circuitry used to execute embodiments of the present invention under the term "control circuitry." However, the components of this control circuitry need not be unitary, and may be located throughout the disk drive, as would be well understood by those skilled in the art.

The read channel may also comprise additional components not shown, such as an analog low pass filter for filtering the read signal prior to sampling. The read channel may also be rearranged into any suitable configuration; for example, the sample estimator 42 may operate on the read signal sample values 34 input into the equalizer filter 36. In yet another embodiment, the timing recovery 46 may be implemented using a suitable interpolated timing recovery algorithm rather than a synchronous sampling algorithm. In yet another embodiment, the sequence detector 40 may generate the target sample values 44 corresponding to the read signal sample values 38.

Figure 3:
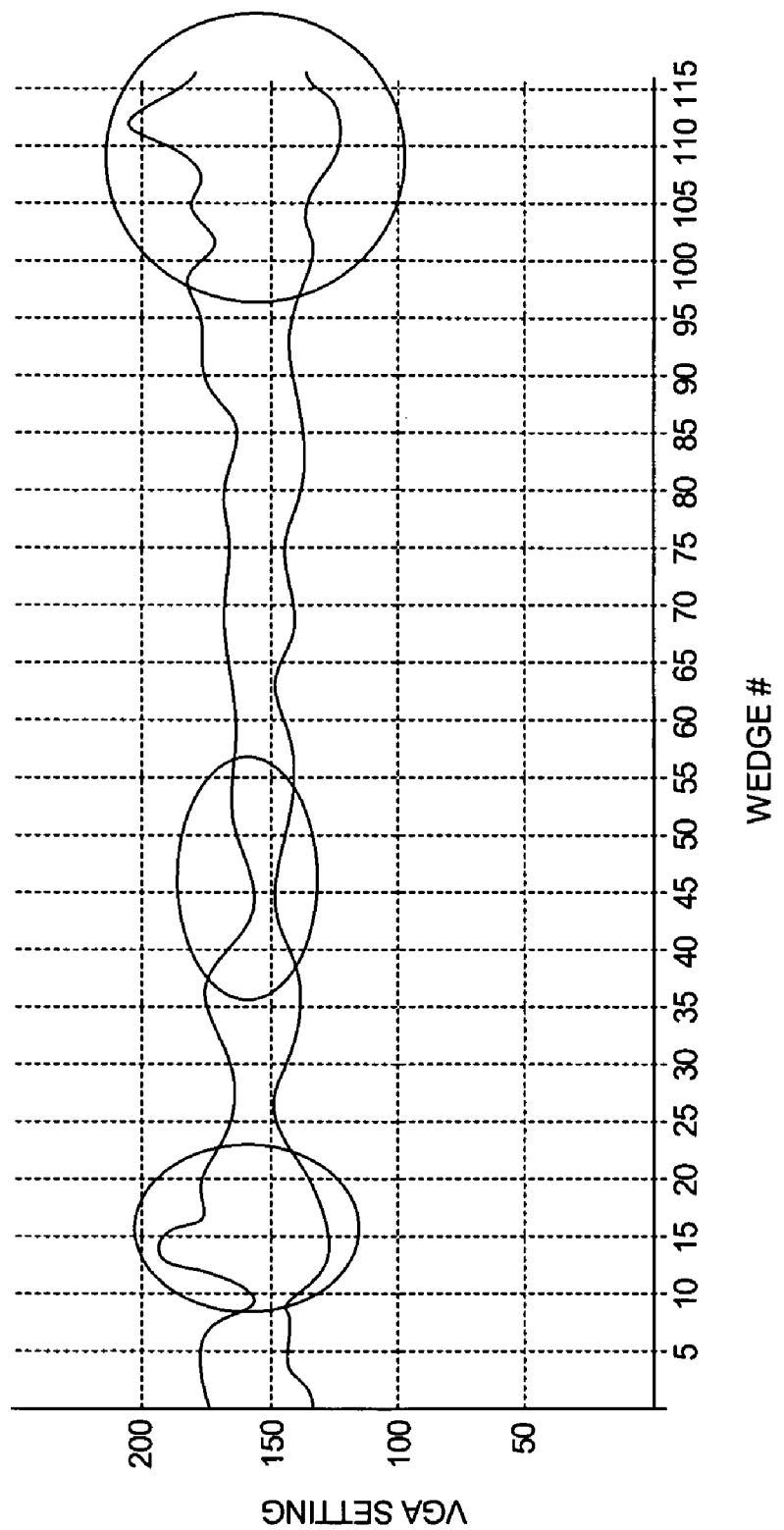
FIG. 3 is a graph of the VGA gain setting versus the servo wedge number wherein a negative correlation in the VGA gain setting indicates warping of the disk.

FIG. 3 is a graph illustrating how disk warping may cause a negative correlation in the VGA gain setting 52 when reading the test patterns from the top and bottom surfaces 2A and 2B. The y-axis in FIG. 3 represents the VGA gain setting 52, and the x-axis represents the servo wedge number (embedded servo sector number) detected while reading the test pattern. The top waveform represents the VGA gain setting 52 while reading the first test pattern from the top surface 2A, and the bottom waveform represents the VGA gain setting 52 while reading the second test pattern from the bottom surface 2B. As shown in the circled areas of the graph, a disk warping is detected when the VGA gain setting 52 increases for the top surface 2A with a corresponding decrease in the VGA gain setting 52 for the bottom surface 2B, or vice versa, due to the fly-height of the heads fluctuating while passing over the warped areas of the disk 2. The increase/decrease in the VGA gain setting 52 is indicative of a negative correlation in the read signal amplitudes.

Figure 4:
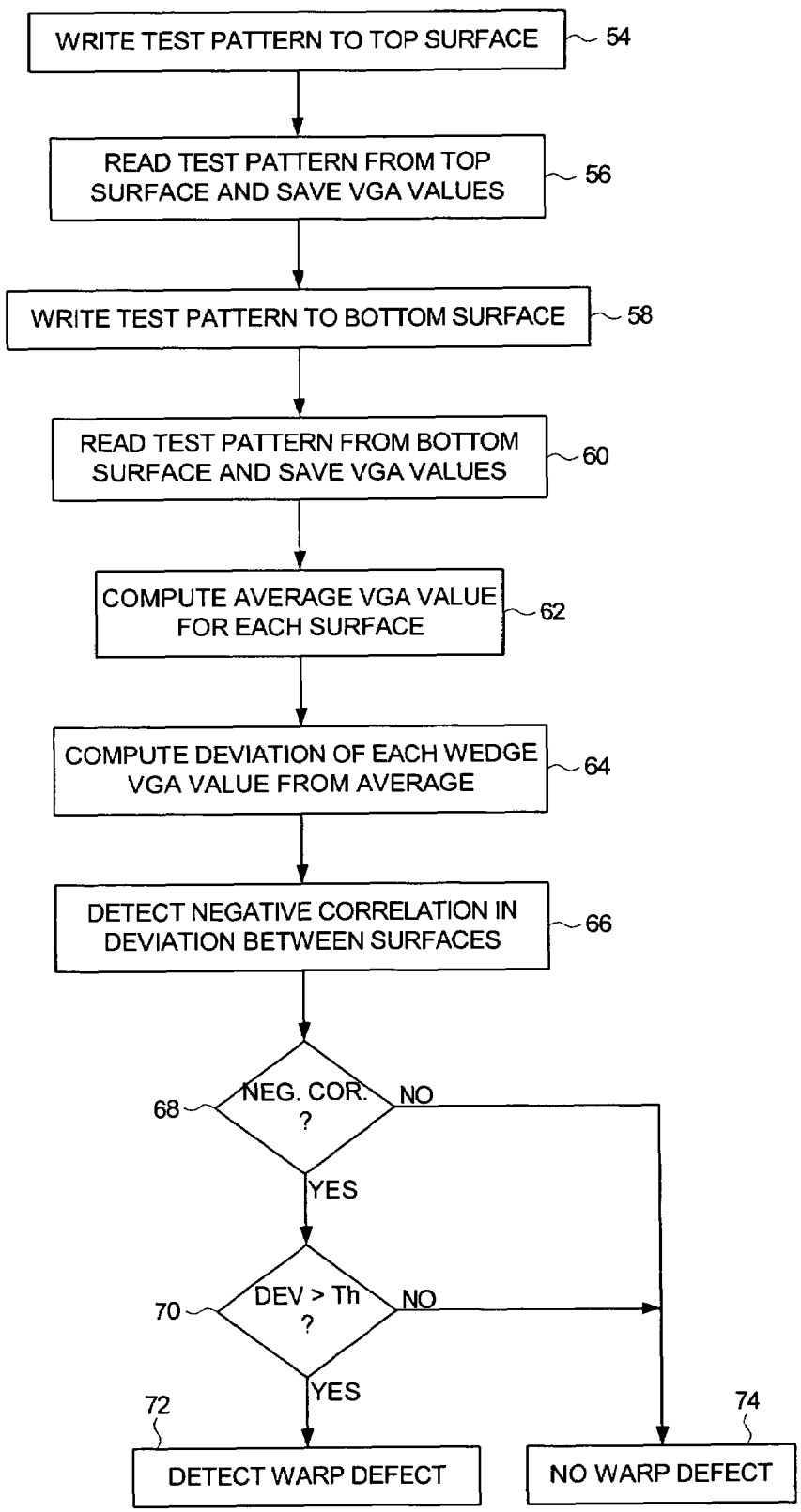
FIG. 4 is a flow diagram according to an embodiment of the present invention for computing an average VGA value (e.g., gain setting or gain error), and a deviation from the average for each servo wedge, wherein disk warping is detected if a negative correlation and the deviation exceed predetermined thresholds.

In one embodiment, the control circuitry 6 performs a suitable statistical analysis of the read signal values to increase the reliability of detecting a warped disk (and reduce the chances of detecting a false positive). In addition, this statistical analysis may be employed to ensure that warping is only indicated when the disk is warped beyond a certain threshold, such that minor warping (having only a minor impact on the operation of the drive) may be permitted. FIG. 4 is a flow diagram illustrating such an embodiment wherein at step 54 a first test pattern is written to the top surface 2A, and at step 56 the first test pattern is read from the top surface 2A, and VGA values (e.g., VGA gain error or gain setting) are saved. At step 58 a second test pattern is written to the bottom surface 2B, and at step 60 the second test pattern is read from the bottom surface 2B, and VGA values (e.g., VGA gain error or gain setting) are saved. In one embodiment, a VGA value is monitored and stored for each servo wedge. At step 62 an average VGA value is computed for each disk surface by summing the VGA values and dividing by the number of servo wedges. At step 64 for each VGA value detected at each servo wedge, a deviation is computed from the average VGA value to generate a plurality of deviation values. At step 66, the plurality of corresponding deviation values for each surface are processed and compared. If at step 68 a negative correlation between the deviation values from the top and bottom surfaces 2A and 2B is detected (indicating that the amplitudes of the corresponding read signals are also negatively correlated), and at step 70 the deviation values of both surfaces exceed a predetermined threshold, then at step 72 the disk 2 fails the disk warped test. Otherwise, at step 74 the disk 2 passes the disk warp test.

These threshold values may be chosen in a number of ways. In one embodiment, the threshold values may be generated by evaluating a plurality of disks to determine which of them are unusable due to disk warping. The warping characteristics of the warped disks may then be used to calibrate unacceptable thresholds for various read signal values. Alternatively, the threshold values may be derived from a more theoretical analysis.

The deviation values computed at step 64 of FIG. 4 may be computed using any suitable algorithm. In one embodiment, a deviation value is generated by computing the difference between the measured VGA value at each servo wedge (each servo sector) and the average VGA value for the disk surface, and then dividing the difference by the average of the measured VGA value and the average VGA value:

$$DEV = \frac{avg - measured}{\frac{avg + measured}{2}}$$

Figure 5:
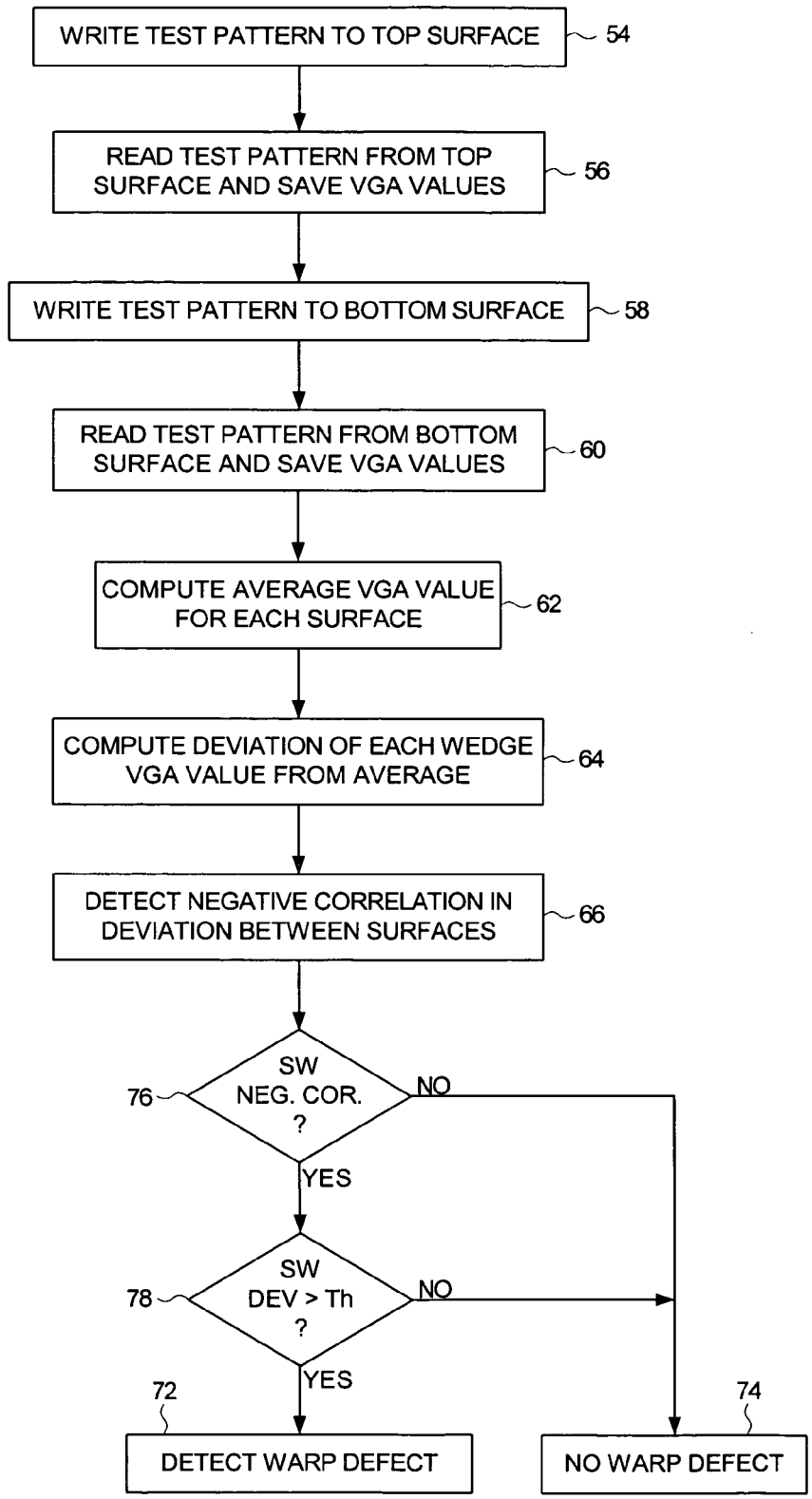
FIG. 5 is a flow diagram according to an embodiment of the present invention wherein disk warping is detected if the negative correlation and deviation values within a sliding window exceed predetermined thresholds.

FIG. 5 is a flow diagram according to another embodiment of the present invention wherein the control circuitry 6 performs additional statistical analysis to further increase the reliability of the disk warp test. At step 76 a sliding window of correlation values are evaluated to determine whether a negative correlation exists between the deviation values from the top and bottom surfaces 2A and 2B, and at step 78 a sliding window of the deviation values are evaluated to determine whether the deviation exceeds a predetermined threshold. In other words, a plurality of deviation values of nearby servo wedges may be evaluated at one time in order to detect warping more accurately. Evaluating a sliding window of values improves the reliability of detecting a disk warping in comparison with evaluating a single point.

In one embodiment, a suitable filtering algorithm is employed over the sliding window to further improve the reliability. For example, a running average of the read signal values in the sliding window (e.g., deviation values) may be computed and compared to a threshold. In addition, outliers may be removed from the running average to improve reliability. In yet another embodiment, the control circuitry 6 compares m values (e.g., the number of values within the sliding window) to a threshold (the values may be, e.g., deviation values) and detects a disk warping only if n of the m values exceed the threshold (wherein n and m are predetermined integers, and n is less than or equal to m). The size of the sliding window may be chosen to contain any number of read signal values. In one embodiment, the sliding window may include the values corresponding to five adjacent servo wedges, and the sliding window may be moved continuously over the entire surface of the disk, evaluating every adjacent grouping of five servo wedges.

Figure 6:
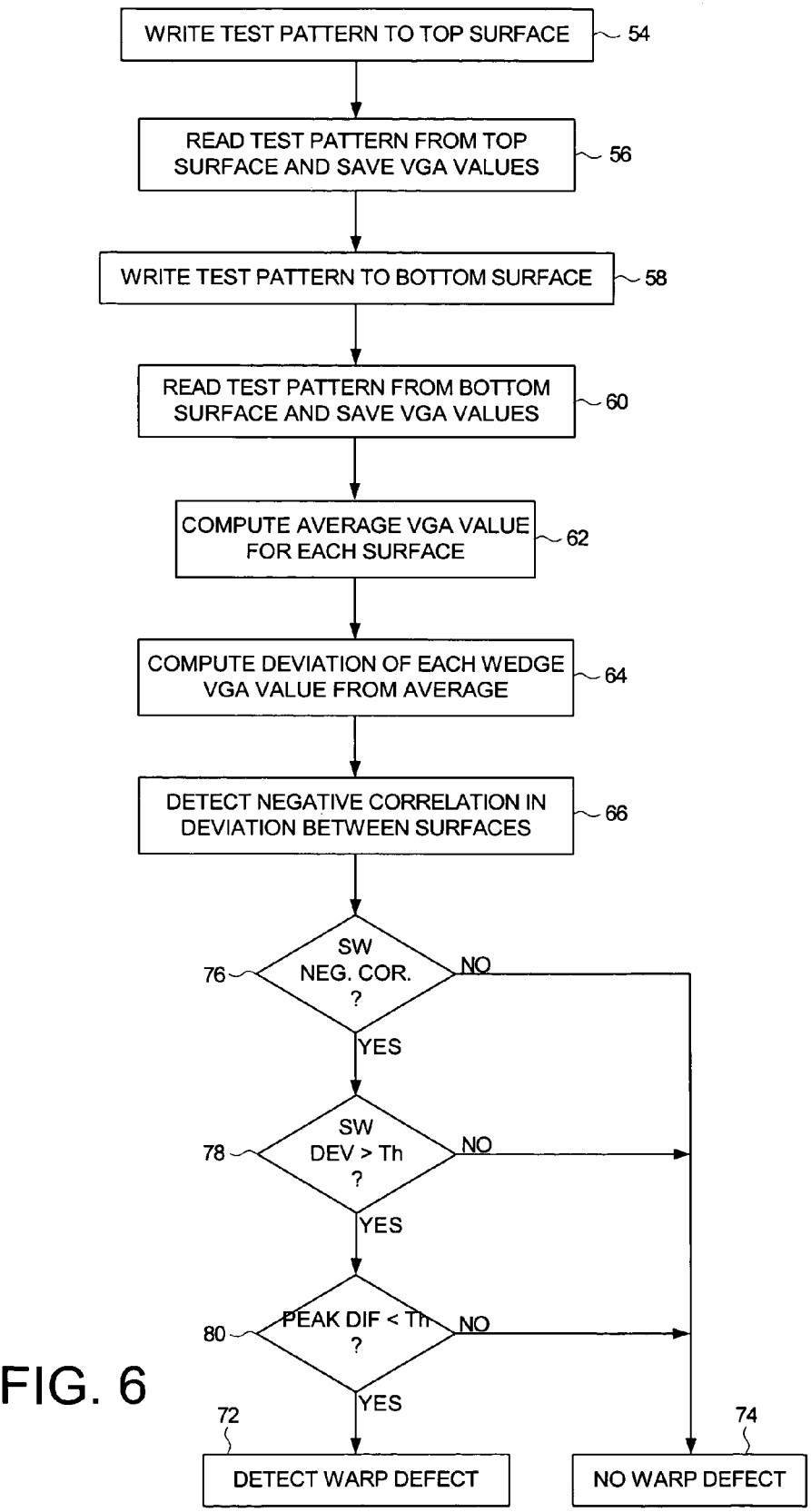
FIG. 6 is a flow diagram according to an embodiment of the present invention wherein disk warping is detected if the difference in the location of peaks of the deviation values from the top and bottom surfaces is less than a predetermined threshold.

FIG. 6 is a flow diagram according to an embodiment of the present invention wherein at step 80 the control circuitry 6 evaluates a difference between the locations of peak read signal values of opposing heads (e.g., deviation values) to detect the disk warping. That is, if the difference between the locations of the closest peaks in the read signal values of opposing heads exceeds a predetermined threshold, the negative correlation will be considered insufficient to detect a disk warping. This is illustrated in FIG. 3 wherein a disk warping is detected (indicated by the circles) only at locations wherein the peaks of the VGA gain setting values for the top and bottom heads occur over substantially the same locations (according to some predetermined threshold).

FIGS. 7A-7D show another embodiment of the present invention wherein the read signal values that are monitored comprise bits of a detected bit sequence that provide an indirect indication of the read signal amplitudes. The waveform of FIG. 7A represents the read signal while reading the top surface 2A, and the waveform of FIG. 7D represents the read signal while reading the bottom surface 2B. In FIG. 7A, "0" bits are detected as long as the read signal sample values exceed a drop-out threshold as illustrated in FIG. 7B. When the amplitude of the read signal decreases below the drop-out threshold, "1" bits are detected as shown in FIG. 7B. In FIG. 7D, "0" bits are detected as long as the read signal sample values fall below a drop-in threshold as illustrated in FIG. 7C. When the amplitude of the read signal exceeds the drop-in threshold, "1" bits are detected as shown in FIG. 7C.

A disk warping may therefore be detected when there is a correlation between the drop-out bits ("1" bits) of FIG. 7B and the drop-in bits ("1" bits) of FIG. 7C. In one embodiment, a drop-out bit sequence and a drop-in bit sequence are generated for each disk surface using appropriate thresholds. The drop-out bit sequence on a first disk surface is compared to the drop-in bit sequence of the opposite disk surface, and the drop-in bit sequence of the first disk surface is compared to the drop-out bit sequence of the opposite disk surface. In yet another embodiment, the estimated bit sequence and/or the branch metrics generated by the sequence detector 40 of FIG. 2A is evaluated to detect the warping of the disk. Similar to FIGS. 4-6, the control circuitry 6 may employ any suitable statistical algorithm on the detected bit sequences to improve the reliability of detecting a warped disk.

We claim:

1. A disk drive comprising:
   (a) a disk comprising a top surface and a bottom surface;
   (b) a top head actuated over the top surface of the disk;
   (c) a bottom head actuated over the bottom surface of the disk; and
   (d) control circuitry operable to detect a warping of the disk by:
   writing a first test pattern to the top surface;
   reading the first test pattern to generate a first read signal;
   monitoring a first read signal value proportional to an amplitude of the first read signal;
   writing a second test pattern to the bottom surface;
   reading the second test pattern to generate a second read signal;
   monitoring a second read signal value proportional to an amplitude of the second read signal; and
   processing the first and second read signal values to detect a negative correlation between the amplitudes of the first and second read signals.

2. The disk drive as recited in claim 1, wherein the first test pattern is the same as the second test pattern.

3. The disk drive as recited in claim 1, wherein the first test pattern is different than the second test pattern.

4. The disk drive as recited in claim 1, wherein:
   (a) the control circuitry comprises a variable gain amplifier (VGA) for amplifying the first read signal and the second read signal; and
   (b) the first and second read signal values are used to adjust a gain of the VGA.

5. The disk drive as recited in claim 4, wherein:
   (a) the control circuitry further comprises a gain control operable to compute a gain error relative to a difference between a target amplified read signal amplitude and a measured amplified read signal amplitude;
   (b) the gain control is further operable to adjust the gain of the VGA in response to the gain error; and
   (c) the first and second read signal values comprise the gain error.

6. The disk drive as recited in claim 4, wherein the control circuitry is further operable to:
   (a) monitor a first plurality of read signal values used to adjust the gain of the VGA while reading the first test pattern, and compute a first average value in response to the first plurality of read signal values;
   (b) compute a deviation of each of the first plurality of read signal values from the first average value to generate a first plurality of deviation values;
   (c) monitor a second plurality of read signal values used to adjust the gain of the VGA while reading the second test pattern, and compute a second average value in response to the second plurality of read signal values;
   (d) compute a deviation of each of the second plurality of read signal values from the second average value to generate a second plurality of deviation values; and
   (e) process the first and second plurality of deviation values.

7. The disk drive as recited in claim 6, wherein the control circuitry is further operable to compute a running average of the first and second plurality of deviation values.

8. The disk drive as recited in claim 6, wherein the control circuitry is further operable to compare the first and second plurality of deviation values to a threshold, wherein:
   the warping of the disk may be detected if n out of m deviation values exceed the threshold; and
   n and m are predetermined integers where n is less than or equal to m.

9. The disk drive as recited in claim 6, wherein the control circuitry is further operable to:
   (a) compute a first peak in the first plurality of deviation values;
   (b) compute a second peak in the second plurality of deviation values; and
   (c) compare a location of the first peak to a location of the second peak.

10. The disk drive as recited in claim 1, wherein the control circuitry is further operable to compare the negative correlation to a threshold.

11. The disk drive as recited in claim 1, wherein:
(a) the control circuitry is further operable to detect a first bit sequence in response to the first read signal, and detect a second bit sequence in response to the second read signal; and
(b) the first read signal value comprises at least one bit in the first bit sequence, and the second read signal value comprises at least one bit in the second bit sequence.

12. A method of detecting disk warping in a disk drive, the disk drive comprising a disk having a top surface and a bottom surface, a top head actuated over the top surface and a bottom head actuated over the bottom surface, the method comprising the steps
(a) writing a first test pattern to the top surface;
(b) reading the first test pattern to generate a first read signal;
(c) monitoring a first read signal value proportional to an amplitude of the first read signal;
(d) writing a second test pattern to the bottom surface;
(e) reading the second test pattern to generate a second read signal;
(f) monitoring a second read signal value proportional to an amplitude of the second read signal; and
(g) processing the first and second read signal values to detect a negative correlation between the amplitudes of the first and second read signals.

13. The method as recited in claim 12, wherein the first test pattern is the same as the second test pattern.

14. The method as recited in claim 12, wherein the first test pattern is different than the second test pattern.

15. The method as recited in claim 12, further comprising the steps of:
amplifying the first read signal in response to the first read signal value; and
amplifying the second read signal in response to the second read signal value.

16. The method as recited in claim 15, further comprising the step of computing a gain error relative to a difference between a target amplified read signal amplitude and a measured amplified read signal amplitude, wherein the first and second read signal values comprise the gain error.

17. The method as recited in claim 15, further comprising the steps of:
monitoring a first plurality of read signal values used to adjust the amplification of the first read signal while reading the first test pattern;
computing a first average value in response to the first plurality of read signal values;
computing a deviation of each of the first plurality of read signal values from the first average value to generate a first plurality of deviation values;
monitoring a second plurality of read signal values used to adjust the amplification of the second read signal while reading the second test pattern;
computing a second average value in response to the second plurality of read signal values;
computing a deviation of each of the second plurality of read signal values from the second average value to generate a second plurality of deviation values; and
processing the first and second plurality of deviation values.

18. The method as recited in claim 17, further comprising the step of computing a running average of the first and second plurality of deviation values.

19. The method as recited in claim 17, further comprising the step of comparing the first and second plurality of deviation values to a threshold, wherein:
the warping of the disk may be detected if n out of m deviation values exceed the threshold; and
n and m are predetermined integers where n is less than or equal to m.

20. The method as recited in claim 17, further comprising the steps of computing a first peak in the first plurality of deviation values;
computing a second peak in the second plurality of deviation values; and
comparing a location of the first peak to a location of the second peak.

21. The method as recited in claim 12, further comprising the step of comparing the negative correlation to a threshold.

22. The method as recited in claim 12, wherein further comprising the steps of detecting a first bit sequence in response to the first read signal, and detecting a second bit sequence in response to the second read signal, wherein the first read signal value comprises at least one bit in the first bit sequence, and the second read signal value comprises at least one bit in the second bit sequence.

* * * * *